Sept. 6, 1966 R. E. THUN ET AL 3,271,192
CAPACITORS AND PROCESS FOR MAKING SAME
Filed June 5, 1962
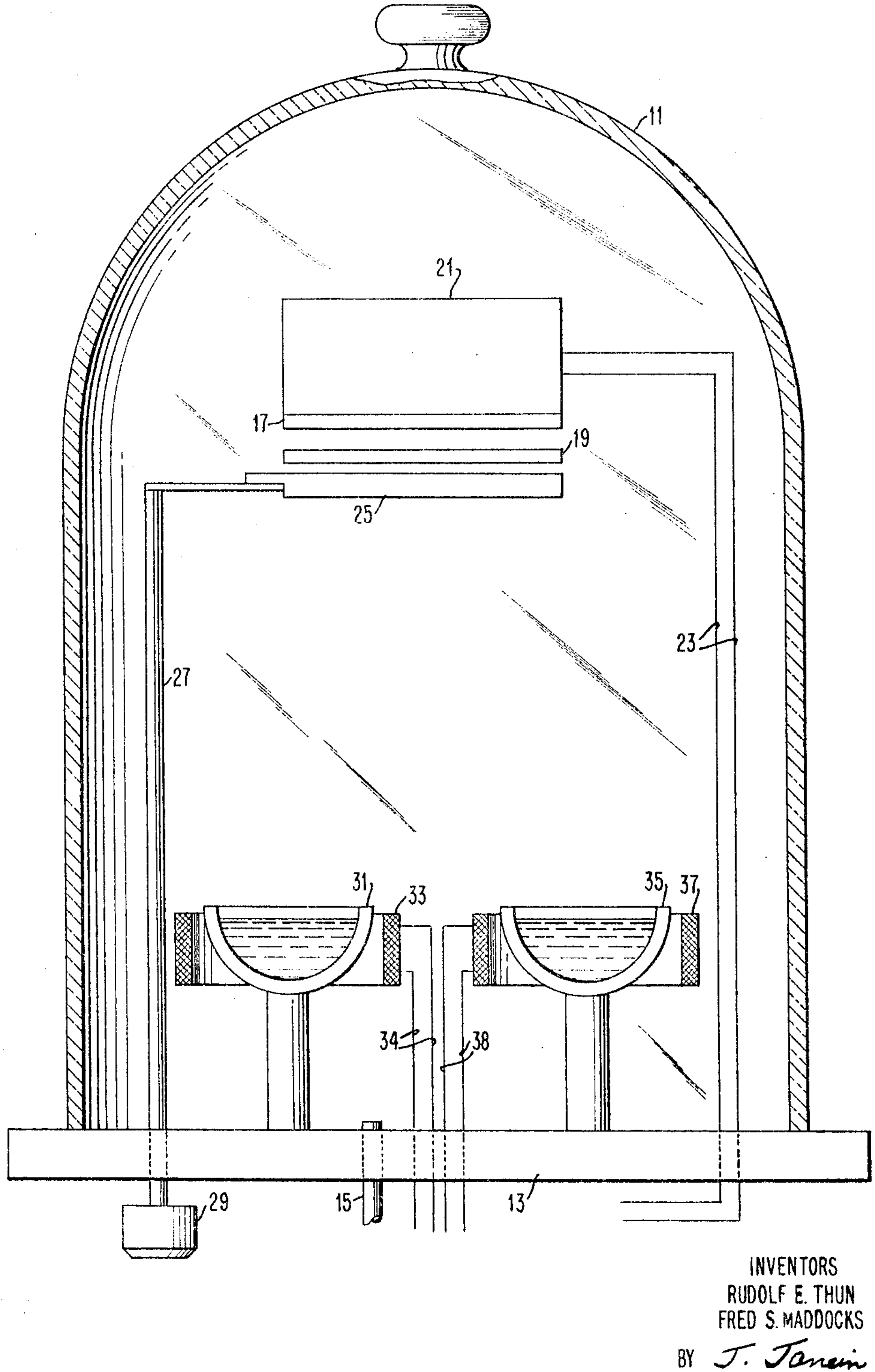
INVENTORS
RUDOLF E. THUN
FRED S. MADDOCKS
BY J. Tanein Jr.
ATTORNEY 3,271,192

CAPACITORS AND PROCESS FOR MAKING SAME

Rudolf E. Thun, West Hurley, and Fred S. Maddocks, Kingston, N.Y., assignors to International Business Machines Corporation, New York, N.Y., a corporation of New York Filed June 5, 1962, Ser. No. 200,256
11 Claims. (Cl. 117—217)

This application is a continuation-in-part of our now abandoned previously copending United States patent application, Serial Number 53,242, filed on August 31, 1960, for "Capacitors and Process for Making Same."

This invention relates to dielectrics having a high dielectric constant as well as a process for producing the same.

Multilayer thin film electrical devices, now being developed and used, provide electronic circuits having a high number of components per unit of volume, low weight, and improved reliability. The passive circuit elements (such as resistors, capacitors and conductors) are deposited on a substrate in a high vacuum or other controlled environment. Nondeposited active elements (such as transistors and diodes) are secured to the substrate with their leads bonded to the lands of the deposited circuitry and in some instances the active elements may also be deposited. By interleaving insulating layers, capacitors and multilayers of other passive elements may be formed on a single substrate. Separate thin-film components on the same substrate are connected to each other by overlapping a portion of the films, thereby largely eliminating the need for terminals, conductors and the packaging of individual components.

One of the major advantages of multilayer thin-film electrical devices is in their ability to accommodate a large number of components per unit volume, commonly referred to as the packing-density factor of the circuits. Capacitor elements, however, have caused problems in the thin-film art relative to the packing-density factor.

The capacitance of a capacitor is inversely proportional to the thickness of the dielectric and directly proportional to its plate area and dielectric constant. Thus, in order to obtain a high capacitance, if the dielectric constant is low the plate area must be made large, and conversely in order to make capacitors having small plate areas the dielectric constant must be large.

Heretofore, the low dielectric constant of dielectric material suitable for use in the fabrication of capacitors (on the order of six—air being one) has hindered the achievement of a high packing-density factor of multilayer thin film electrical devices, because of the large plate area required and the fact that extremely thin films tend to break down at higher voltages.

The prior art dielectrics, used in fabricating the capacitors in the multilayer thin film electrical devices, have a dielectric constant which is relatively independent of the thickness of the dielectric between the plates and thus, since capacitance is inversely proportional to the thickness of the dielectric, the capacitance decreased as the thickness increased. Inasmuch as the capacitance of a capacitor cannot be measured during deposition and due to slight changes in the thickness of a film, the capacitance of deposited capacitors fabricated from the prior art dielectrics varied substantially from capacitor to capacitor.

It is, therefore, an object of this invention to provide a new and improved dielectric having a high dielectric constant.

It is a further object of this invention to provide a novel process for making a dielectric having a high dielectric constant.

Another object of this invention is to provide a new and improved capacitor having a high capacitance.

A further object of this invention is to provide a novel process for making a capacitor having a high capacitance.

A further object of this invention is to provide a new and improved capacitor with a capacitance substantially independent of the thickness of the dielectric.

It is still a further object of this invention to provide a novel process for making a capacitor with a capacitance substantially independent of the thickness of the dielectric.

Yet another object of this invention is to provide a novel process for fabricating a capacitor compatible with the process of making multilayer thin-film electrical devices.

A feature of this invention is a dielectric, and a process for making the same, wherein the dielectric constant of the dielectric is linearly proportional to the thickness of the dielectric. It is in this manner that the objective of providing a novel process for making a capacitor with a capacitance substantially independent of the thickness of the dielectric is achieved.

Accordingly, it has been discovered that the rare earth fluorides and oxides evaporated in a partial vacuum in contact with a metal having a high melting point will deposit on a substrate as a dielectric having a high dielectric constant. The word substrate as used in this description and in the claims means any surface onto which a film may be deposited including a previously deposited film.

The single figure is a schematic view of apparatus which may be used in carrying out the invention.

Referring to the drawing for a description of apparatus for carrying out this invention, bell jar 11 is placed on and makes an airtight seal with the base plate 13. A vacuum is obtained in the chamber formed by the combination of the bell jar and the base plate by operating a pump (not shown). The pump is connected to the chamber through orifice 15 in base plate 13. The chamber is exhausted by operating the pump until a low pressure exists within the chamber. Substrate 17 and mask 19, shown in an evaporation position, are supported by well-known means not shown.

Because of the many different combinations of patterns which are necessary to produce a complex multilayer thin-film electrical circuit, it may be desirable to fabricate more than one substrate during a single evacuation of the vacuum chamber and to deposit a number of coatings of thin films of different configurations on the same substrate. Substrate processing apparatus showing apparatus capable of applying one or more vacuum evaporated coatings to a plurality of substrates is described in United States Patent Number 3,023,727, to Theodoseau et al., filed on September 19, 1959, and assigned to the same assignee as the present invention.

A heater 21 supplied with electricity by wires 23 heats the substrate to the desired temperature. A shutter 25 mounted on rotatable shaft 27 is controlled by knob 29. By operation of the shutter, selective areas of the mask may be exposed to control the area of deposition on the substrates. A first evaporation boat 31, heated by coil 33, contains an electrically conductive element which is to be deposited on substrate 17. A second evaporation boat 35, heated by coil 37, contains a dielectric compound which is to be deposited on substrate 17.

Means (not shown) are employed for supplying controlled and variable amounts of electrical energy to coils 33 and 37 by wires 34 and 38 respectively. The energy supplied to the coils 33 and 37 is monitored separately to control the amount of each substance evaporated and therefore the thickness of the films deposited. Means for controlling the thickness of the film on the substrate is shown in more detailed form in the copending United States patent application, Serial Number 40,717 to Fury et al., filed July 5, 1960, and assigned to the same assignee as the present invention. The evaporant vapors condense on a substrate, at points thereon, defined by the mask and shutter.

The present invention provides a process by which dielectrics having a high dielectric constant may be fabricated. In accordance therewith, rare earth fluorides and oxides are evaporated in contact with a metal having a high melting point, and are deposited on a substrate. Preferably, the evaporant rare earth fluorides and oxides are placed in an evaporation boat composed of a selected high melting point metal from which the evaporant is to be evaporated. The metal may be placed in contact with the evaporant during the evaporation, however, by other well-known means.

A suitable metal which has proven satisfactory and is used in the following examples is tantalum. Other metals which possess the necessary characteristic include tungsten, molybdenum, platinum, iridium, osmium, and alloys thereof.

Lanthanum fluoride, cerium fluoride and cerium dioxide, representative of the rare earth fluorides and oxides are used in the following examples to illustrate the invention. The other rare earth fluorides and oxides have the same characteristics and may also be used, as well as mixtures of the rare earth fluorides and oxides.

During the evaporation of the rare earth fluorides and oxides, the evaporation boat is maintained at a temperature of between 1300° C. and 1750° C., as measured by an optical pyrometer. The substrate is maintained at a temperature of between 25° C. and 400° C. and the pressure in the vacuum chamber is maintained at $1\times10^{-3}$ mm. Hg to $1\times10^{-10}$ mm. Hg.

In order to disclose the nature of the present invention clearly, the following illustrative example will be given. It is to be understood that the invention is not limited to the specific conditions or details set forth in these examples, except insofar as such limitations are particularly specified in the appended claims.

All of the evaporants utilized were ignited (baked) in air to ascertain that substantially all moisture was driven out of the evaporant. This practice is common in the art of vacuum deposition, the purpose being to prevent the evaporant from spattering from its evaporating surface or container. As stated above, any suitable substrate complies with the spirit of this invention. However, the basic substrate from which the following examples were derived was glass. The glass was given a coating of silicon monoxide to insure the existence of a smooth surface and preclude the possibility of the formation of "pinholes," the presence of which would tend to cause electrical shorts between the capacitor plates.

The capacitors were fabricated by placing a conductive material such as aluminum in boat 31 and a dielectric compound of the rare earth fluorides or oxides in evaporation boat 35. Bell jar 11 was then placed on the base plate 13 and a chamber pressure of $1\times10^{-5}$ mm. Hg was obtained. Mask 19 and shutter 25 were then placed in position. The proper mask configuration was determined by selectively moving shutter 25 to expose the points on substrate 17 on which an aluminum conductor-evaporant was to be deposited. Heater 21 was energized to heat the substrate. Substrate temperatures from 25° C. to 400° C. were utilized; however, the general temperature of the substrate had no apparent bearing on the resultant product.

Energy was supplied to coil 33 heating the evaporation boat 31 causing the aluminum in the evaporation boat 31 to evaporate. The aluminum thereupon condensed in a layer on substrate 17 in a pattern defined by the mask and shutter. The proper configuration was next determined for the rare earth fluoride or oxide layer by selectively moving shutter 25 to expose the pattern over the aluminum layer on substrate 17 on which the dielectric evaporant was to be deposited. Energy was then applied to coil 37 to heat evaporation boat 35 causing the rare earth fluoride or oxide in evaporation boat 35 to evaporate and to condense on substrate 17, thereby forming a dielectric layer over the aluminum conductive layer. Temperatures below about 1350° C., although the evaporant will evaporate to some degree, provide an evaporation rate that is too slow for practical or commercially reasonable utility. The evaporation rates used in the examples set forth were in the neighborhood of 1000 A. per minute. Temperatures were measured during evaporations by the use of an optical pyrometer, the advantages and limitations of which are well known in the art.

Evaporation temperatures in excess of 1750° C. have two detrimental effects in particular:

(a) The rare earth fluoride or oxide is excessively decomposed, rendering a dielectric layer that does not provide the desirable properties of a capacitor, in that the breakdown voltage is too low for practical utility.

(b) The deposited film has a tendency to craze, crazing as used in the art being a cracking, blistering or peeling of the deposited film from the surface of the substrate upon which it has been deposited. A further detriment of excessive temperatures of evaporation is that shorts in the dielectric occur frequently, a drawback not found in the process as taught herein.

The proper mask configuration was next determined for the second aluminum conductive layer by selectively moving shutter 25 to expose the points on substrate 17 on which the aluminum conductive layer was to be deposited.

Energy was then applied to coil 33 to heat evaporation boat 31 causing the aluminum in evaporation boat 31 to evaporate and condense on substrate 17 in a second aluminum conductive layer, the dielectric being sandwiched between two aluminum layers thereby forming a capacitor.

The capacitors were then removed from the vacuum chamber and the dielectric constant and thickness of the dielectric were measured by well-known techniques.

Pressures obtained in the chambers for the following examples ranged between $1\times10^{-5}$ mm. Hg to $5\times10^{-5}$ mm. Hg. It should be pointed out, however, that pressures varying in several orders of magnitude from those mentioned herein do provide generally adequate results. The only criticality of pressure required is that it be sufficient to provide practical and commercially reasonable evaporation rates within the specified critical temperature range.

EXAMPLE 1

Ten capacitors were fabricated as described above. Cerium fluoride was evaporated from a tantalum evaporation boat at a temperature of approximately 1450° C. as measured by an optical pyrometer, and deposited on the aluminum conductive layer. The second conductive layer was deposited over the cerium fluoride dielectric to form capacitors and the capacitors were removed and tested. The results are shown in Table 1. The dielectric constants were measured at one kc. The dielectric constant of capacitor 8, for example, was measured at 1 kc. for the film thickness of 6000 Angstroms and found to be 280.

One indication of the quality of a capacitor is its loss tangent. In a perfect capacitor the current leads the voltage by 90 degrees. The loss tangent is the tangent of the angle represented by the difference between a perfect capacitor's lead angle and the actual lead angle. The loss tangent for this example was .03 at 1 kc. for the 10 capacitors. It can be seen that the dielectric constant increases generally linearly for the thickness range from 1090 to 6000 Angstroms. This example using cerium fluoride (which has a bulk dielectric constant of 6) and tantalum was repeated numerous times with substantially the same results.

EXAMPLE 2

Ten capacitors were fabricated as described above. Lanthanum fluoride was evaporated from a tantalum evaporation boat at 1600° C., as measured by an optical pyrometer, and deposited over the aluminum conductive layer. The conductive layer was deposited over the lanthanum fluoride dielectric to form capacitors, and the capacitors were removed and tested. The results are shown in the Table 2. The dielectric constant of the capacitor 9, for instance, was measured at 1 kc. for the film thickness of 2870 Angstroms and found to be 76.1. It can be seen that the dielectric constant increases generally linearly for the thickness range from 973 to 2870 Angstroms. The loss tangent of the ten capacitors at one kc. was 0.3.

EXAMPLE 3

Ten capacitors were fabricated as described above. Cerium dioxide was evaporated from a tantalum evaporation boat at 1650° C. as measured by an optical pyrometer. The evaporant was then deposited over the aluminum conductive layer. The second conductive layer was deposited over the cerium dioxide to form a capacitor, and the capacitor was removed and tested. The results are shown in Table 3. The dielectric constant, for instance, of capacitor 7 was measured at 1 kc. for the film thickness of 1091 Angstroms and found to be 60.9. It can be seen that the dielectric constant increases generally linearly for the thickness range from 268 to 1091 Angstroms. The bulk dielectric value of cerium dioxide is 7.0. The loss tangent of the ten capacitors was measured at 0.03.

It can be seen that small variations in the thickness do not substantially change the capacitances of the capacitors deposited, since although the distance between the plates increases, so does the dielectric constant of the dielectric increase. Thus the evaporation of a rare earth fluoride or oxide, or mixtures thereof, in contact with a metal having a high melting point, results in deposition of a dielectric having a high dielectric constant which varies generally linearly with its thickness.

*Table 1.—Cerium fluoride*

| Capacitor | Thickness in Angstroms | Dielectric Constant |
|---|---|---|
| 1 | 1,090 | 53 |
| 2 | 1,090 | 57 |
| 3 | 3,000 | 102 |
| 4 | 3,000 | 115 |
| 5 | 3,000 | 90 |
| 6 | 3,000 | 135 |
| 7 | 6,000 | 245 |
| 8 | 6,000 | 280 |
| 9 | 6,000 | 250 |
| 10 | 6,000 | 240 |

*Table II.—Lanthanum fluoride*

[Evaporated at 1600° C.]

| Capacitor | Thickness in Angstroms | Dielectric Constant |
|---|---|---|
| 1 | 973 | 28.0 |
| 2 | 973 | 29.6 |
| 3 | 2,020 | 52.0 |
| 4 | 2,020 | 64.5 |
| 5 | 2,020 | 63.5 |
| 6 | 2,020 | 65.0 |
| 7 | 2,870 | 78.5 |
| 8 | 2,870 | 71.3 |
| 9 | 2,870 | 76.1 |
| 10 | 2,870 | 71.0 |

*Table 3.—Cerium dioxide*

[Evaporated at 1650° C.]

| Capacitor | Thickness in Angstroms | Dielectric Constant |
|---|---|---|
| 1 | 268 | 21.0 |
| 2 | 268 | 20.2 |
| 3 | 268 | 20.8 |
| 4 | 648 | 40.5 |
| 5 | 648 | 41.5 |
| 6 | 648 | 44.2 |
| 7 | 1,091 | 60.9 |
| 8 | 1,091 | 60.5 |
| 9 | 1,091 | 62.3 |
| 10 | 1,091 | 59.8 |

It is not clearly understood why a dielectric having a high dielectric constant results from evaporating a rare earth fluoride or oxide in the presence of a metal having a high melting point. Nor is it clearly understood why the dielectric constant increases generally linearly with the increase in thickness of the dielectric deposited.

It may be theorized that a high dielectric constant results because during the evaporation of the rare earth fluorides or oxides in the presence of a metal having a high melting point, a reaction takes place which slightly decomposes the rare earth fluoride or oxide, resulting in an enrichment of the metal content of the evaporant.

It appears that the initial deposition (on the order to 100 A.) acts as a barrier layer—a depletion region of charge carriers. The actual capacity of the capacitor results from this depletion region. Subsequent deposition of the rare earth fluoride or oxide layer acts as a high-resistance semiconductor. The semiconductor region probably increases the breakdown strength of the capacitor to a considerably greater degree than if only the depletion region were present.

The independence of the capacitance upon the thickness of the dielectric is probably due to the fact that the effective capacitor is comprised primarily of the barrier layer. This may be explained by the fact that the charge carriers move across the semiconductor region relatively uninhibited as compared to their movement across the barrier layer; therefore, the thickness of the two depletion regions, one adjacent to each plate, and not the composit thickness of the rare earth film, would determine the effective capacitance.

While particular embodiments of the invention have been described, it will be understood, of course, that the invention is not limited thereto since many modifications may be made and it is, therefore, contemplated to cover by the appended claims any such modifications that fall within the true spirit and scope of the invention.

We claim:

1. A process of producing a capacitor having a high dielectric constant, which comprises:

evaporating in a low pressure vacuum chamber an evaporant heated to a temperature of between 1350° C. and 1750° C., said evaporant consisting essentially of material selected from the group consisting of the rare earth fluorides and oxides and mixtures thereof, in contact with a metal having a high melting point, and condensing said evaporant on a conductive substrate to form a dielectric film over the conductive substrate;

and evaporating a conductive material and condensing the conductive evaporant on said dielectric film to form the conductive member of a capacitor.

2. A capacitor produced by the process of claim 1.

3. A process of fabricating a capacitor having a high dielectric constant, which comprises:

evaporating a conductive material and condensing the conductive evaporant on a substrate to form a conductive film;

evaporating in a low pressure vacuum chamber an evaporant heated to a temperature of between 1350° C. and 1750° C., said evaporant consisting essentially of material selected from the group consisting of the rare earth fluorides and oxides and mixtures thereof, in contact with a metal having a high melting point selected from the group consisting of tantalum, tungsten, molybdenum, iridium, osmium, platinum and alloys thereof and condensing said evaporant on the conductive film to form a dielectric film over the conductive film;

and evaporating a conductive material and condensing the conductive evaporant on said dielectric film to form the conductive member of a capacitor.

4. A process of fabricating a capacitor having a high capacitive dielectric constant which comprises:

evaporating a conductive material and condensing the conductive evaporant on a substrate to form a conductive film;

evaporating in a low pressure vacuum chamber an evaporant consisting essentially of cerium fluoride in contact with tantalum at a temperature of between 1350° C. and 1750° C.;

condensing said evaporant on said conductive film to form a dielectric film over said conductive film;

and evaporating a conductive material and condensing the conductive evaporant on said dielectric film to form the conductive member of a capacitor.

5. A process of fabricating a capacitor having a high capacitive dielectric constant which comprises:

evaporating a conductive material and condensing the conductive evaporant on a substrate to form a conductive film;

evaporating in a low pressure vacuum chamber an evaporant consisting essentially of cerium fluoride in contact with tantalum at a temperature of 1450° C.;

condensing said evaporant on said conductive film to form a dielectric film over said conductive film;

and evaporating a conductive material and condensing the conductive evaporant on said dielectric film to form the conductive member of a capacitor.

6. A process of fabricating a capacitor having a high capacitive dielectric constant which comprises:

evaporating a conductive material and condensing the conductive evaporant on a substrate to form a conductive film;

evaporating in a low pressure vacuum chamber an evaporant consisting essentially of lanthanum fluoride in contact with tantalum at a temperature of between 1350° C. and 1750° C.;

condensing said evaporant on said conductive film to form a dielectric film over said conductive film;

and evaporating a conductive material and condensing the conductive evaporant on said dielectric film to form the conductive member of a capacitor.

7. A process of fabricating a capacitor having a high capacitive dielectric constant which comprises:

evaporating a conductive material and condensing the conductive evaporant on a substrate to form a conductive film;

evaporating in a low pressure vacuum chamber an evaporant consisting essentially of lanthanum fluoride in contact with tantalum at a temperature of about 1600° C.;

condensing said evaporant on said conductive film to form a dielectric film over said conductive film;

and evaporating a conductive material and condensing the conductive evaporant on said dielectric film to form the conductive member of a capacitor.

8. The process of fabricating a capacitor having a high capacitive dielectric constant which comprises:

evaporating a conductive material and condensing the conductive evaporant on a substrate to form a conductive film;

evaporating in a low pressure vacuum chamber an evaporant consisting essentially of cerium dioxide in contact with tantalum at a temperature of between 1350° C. and 1750° C.;

condensing said evaporant on said conductive film to form a dielectric film over said conductive film;

and evaporating a conductive material and condensing the conductive evaporant on said dielectric film to form the conductive member of a capacitor.

9. A process of fabricating a capacitor having a high capacitive dielectric constant, which comprises:

evaporating a conductive material and condensing the conductive evaporant on a substrate to form a conductive film;

evaporating in a low pressure vacuum chamber an evaporant consisting essentially of cerium dioxide in contact with tantalum at a temperature of about 1650° C.;

condensing said evaporant on said conductive film to form a dielectric film over said conductive film;

and evaporating a conductive material and condensing the conductive evaporant on said dielectric film to form the conductive member of a capacitor.

10. A process of fabricating a capacitor having a high capacitive dielectric constant, which comprises:

evaporating a conductive material and condensing the conductive evaporant on a substrate to form a conductive film;

placing in an evaporation boat in a vacuum chamber an evaporant consisting essentially of materials selected from the group consisting of the rare earth fluorides and oxides and mixtures thereof, said evaporation boat fabricated from a metal having a high melting point selected from the group consisting of tantalum, tungsten, molybdenum, osmium, iridium, platinum and alloys thereof;

heating said evaporation boat to a temperature of between 1450° C. and 1650° C.;

maintaining the pressure of said vacuum chamber at approximately $1 \times 10^{-5}$ mm. Hg during evaporation;

condensing said evaporant on said conductive film to form a dielectric film over said conductive film;

and evaporating a conductive material and condensing the conductive evaporant on said dielectric film to form the conductive member of a capacitor.

11. A process of fabricating a capacitor having a high capacitive dielectric constant, which comprises:

evaporating a conductive material and condensing the conductive evaporant on a substrate to form a conductive film;

placing an evaporant consisting essentially of materials selected from a mixture of the rare earth fluorides and oxides in an evaporation boat in a low pressure vacuum chamber in contact with a metal having a high melting point, said metal selected from the group consisting of tantalum, tungsten, molybdenum, osmium, iridium, and platinum;

heating said evaporation boat to a temperature of between 1450° C. and 1650° C.;

condensing said evaporant on said conductive film to form a dielectric film over said conductive film;

and evaporating a conductive material and condensing the conductive evaporant on said dielectric film to form the conductive member of a capacitor.

References Cited by the Examiner

UNITED STATES PATENTS

| | | | |
|---|---|---|---|
| 2,398,088 | 4/1946 | Ehlers et al. | 252—63.2 X |
| 2,740,928 | 4/1956 | Ward | 117—106 X |
| 3,034,924 | 5/1962 | Kraus et al. | |
| 3,081,201 | 3/1963 | Koller | 117—217 X |

FOREIGN PATENTS

| | | |
|---|---|---|
| 150,199 | 2/1953 | Australia. |
| 697,403 | 9/1953 | Great Britain. |

(Other references on following page)

OTHER REFERENCES

Hass, G. et al.: I. Optical Properties of Various Evaporated Rare Earth Oxides and Fluorides, in Journal of the Optical Society of America, Ed. by W. R. Brode, pub. by American Institute of Physics, vol. 49, 1959, 116–120, QC 350 06.

Hass, G. et al.: II. 44. Preparation, Properties and Optical Applications of Thin Films of Cerium Dioxide, in Journal of the Optical Society of America, Ed. by W. R. Brode, pub. by American Institute of Physics, vol. 45, 1955, 408, QC 350 06.

Holland: "Vacuum Deposition of Thin Films," publ. by John Wiley and Sons, Inc., N.Y., 1956, pp. 444 and 447, TS 695 H6 C.2.

MURRAY KATZ, *Primary Examiner.*

J. B. SPENCER, RICHARD D. NEVIUS, *Examiners.*

J. P. McINTOSH, *Assistant Examiner.*